US010176649B2

(12) United States Patent
Sannino et al.

(10) Patent No.: US 10,176,649 B2
(45) Date of Patent: Jan. 8, 2019

(54) ELECTRONIC APPARATUS AND METHOD FOR ASSISTING AN AIRCRAFT PILOT, RELATED COMPUTER PROGRAM

(71) Applicant: THALES, Courbevoie (FR)

(72) Inventors: Christian Sannino, Toulouse (FR); Jonathan Sprauel, Toulouse (FR)

(73) Assignee: THALES, Courbevoie (FR)

( * ) Notice: Subject to any disclaimer, the term of this patent is extended or adjusted under 35 U.S.C. 154(b) by 78 days.

(21) Appl. No.: 15/358,559

(22) Filed: Nov. 22, 2016

(65) Prior Publication Data
US 2017/0148236 A1 May 25, 2017

(30) Foreign Application Priority Data

Nov. 23, 2015 (FR) ...................................... 15 02439

(51) Int. Cl.
*G07C 5/08* (2006.01)
*G05B 23/02* (2006.01)
(Continued)

(52) U.S. Cl.
CPC ........... *G07C 5/0825* (2013.01); *B64D 45/00* (2013.01); *G05B 23/0278* (2013.01);
(Continued)

(58) Field of Classification Search
CPC .. G07C 5/0825; G07C 5/0808; G07C 5/0841; B64D 45/00; B64D 2045/0085; G06F 17/30994
See application file for complete search history.

(56) References Cited

U.S. PATENT DOCUMENTS 6,574,537 B2* 6/2003 Kipersztok ........ G05B 23/0278
701/31.8
8,437,904 B2* 5/2013 Mansouri ............. G07C 5/0816
244/152
(Continued)

FOREIGN PATENT DOCUMENTS

DE 10 2008 062 630 A1 6/2010
EP 1 376 362 A1 1/2004
(Continued)

OTHER PUBLICATIONS

Endsley, Mica R., et al: "Situation Awareness Information Requirements for Commercial Airline Pilots", International Center for Air Transportation; Department of Aeronautics & Astronautics; Massachusetts Institute of Technology, Boston, MA 02139, USA, Sep. 1998, URL: http://hdl.handle.net/1721.1/35929.
(Continued)

*Primary Examiner* — Calvin Cheung
(74) *Attorney, Agent, or Firm* — Young & Thompson

(57) ABSTRACT

Disclosed is an electronic apparatus for assisting an aircraft pilot. The aircraft includes avionics equipment implementing operational capacities and a monitoring system configured to determine monitoring information from operational capacities and operating parameters of the avionics equipment. The assistance apparatus includes in an acquisition module configured to acquire the monitoring information and an anomaly detection module configured to detect at least one anomaly from among a breakdown of an avionics equipment and a failure of an operational capacity, from monitoring information and anomaly detection rules contained in a predefined database. The assistance apparatus includes an inference module configured to identify, for each anomaly, one or several causes that may have caused the
(Continued)

anomaly, based on relationships between breakdowns and failures, the relationships being contained in the database.

11 Claims, 3 Drawing Sheets

(51) Int. Cl.
  B64D 45/00 (2006.01)
  G06F 17/30 (2006.01)

(52) U.S. Cl.
  CPC ..... G06F 17/30994 (2013.01); G07C 5/0808 (2013.01); G07C 5/0841 (2013.01); *B64D 2045/0085* (2013.01)

(56) References Cited

U.S. PATENT DOCUMENTS

| | | | |
|---|---|---|---|
| 9,550,583 B2* | 1/2017 | Szeto | G07C 5/008 |
| 2004/0034456 A1* | 2/2004 | Felke | G05B 23/0278 |
| | | | 701/32.9 |
| 2004/0153864 A1 | 8/2004 | Longere | |
| 2008/0215194 A1* | 9/2008 | Bailly | G05B 23/0283 |
| | | | 701/3 |
| 2008/0249678 A1* | 10/2008 | Bailly | G05B 23/0281 |
| | | | 701/31.4 |
| 2008/0269982 A1* | 10/2008 | Bailly | G05B 23/0213 |
| | | | 701/33.4 |
| 2009/0326784 A1 | 12/2009 | Tanner et al. | |
| 2010/0100259 A1* | 4/2010 | Geiter | G06N 5/045 |
| | | | 701/3 |
| 2011/0153535 A1 | 6/2011 | Fournier et al. | |
| 2011/0270482 A1* | 11/2011 | Holzer | G05B 19/4184 |
| | | | 701/31.4 |
| 2012/0259505 A1 | 10/2012 | Turban et al. | |
| 2012/0259587 A1 | 10/2012 | Sannino et al. | |
| 2014/0214263 A1 | 7/2014 | Boucher et al. | |
| 2015/0154505 A1 | 6/2015 | Le Gonidec et al. | |

FOREIGN PATENT DOCUMENTS

| | | |
|---|---|---|
| FR | 2 954 537 A1 | 6/2011 |
| FR | 2 973 882 A1 | 10/2012 |
| FR | 2 973 902 A1 | 10/2012 |
| FR | 2 991 072 A1 | 11/2013 |
| FR | 3 001 556 A1 | 8/2014 |
| WO | 2009/097435 A1 | 8/2009 |

OTHER PUBLICATIONS

Endsley, Mica R.: "Situation Awareness in Aviation Systems", Garland, D. J., Wise, J. A., and Hopkin, V. D. (Eds.), (1999), Handbook of Aviation Human Factors, pp. 257-276, Mahwah, NJ, Lawrence Erlbaum Associates, URL: http://www.pacdeff.com/pdfs/AviationSA-Endsley%201999.pdf.

French Search Report, dated Aug. 5, 2016, from corresponding French Application.

* cited by examiner

ELECTRONIC APPARATUS AND METHOD FOR ASSISTING AN AIRCRAFT PILOT, RELATED COMPUTER PROGRAM

FIELD OF THE INVENTION

The present invention relates to an electronic apparatus for assisting an aircraft pilot.

The invention also relates to a method for assisting the pilot of an aircraft, the method being implemented by such an electronic assistant device.

The present invention also relates to a computer program including software instructions which, when implemented by a computer apparatus, carry out such a method.

"Aircraft" refers to a moving vehicle piloted by at least one pilot, and in particular able to fly in the Earth's atmosphere, such as an airplane, helicopter or drone.

The aircraft comprises avionics equipment implementing operational capacities of the aircraft and a monitoring system, each avionics equipment being associated with one or several operating parameters, the monitoring system being configured to determine monitoring information relative to the aircraft from operating parameters and operational capacities.

"Avionics equipment" refers to a device that is at least partially electronic or a combination of such devices, onboard the aircraft and able to carry out one or several services making it possible to operate the aircraft.

The invention more particularly makes it possible to help the pilot handle abnormal situations caused by a malfunction of one or several avionics equipment during the piloting of the aircraft, in particular when the aircraft is in a flight phase.

BACKGROUND OF THE INVENTION

When certain avionics equipment break down or certain operational capacities fail, the anomaly or anomalies are detected by avionics systems responsible for monitoring them. These equipment breakdowns or operational capacity failures are communicated to the pilot using an alert system, such as a Crew Alerting System (CAS) or a Flight Warning System (FWS), depending on the aircraft builders.

The pilot must next interpret the breakdown or failure messages presented by the alert system, such as the FWS, and the various instruments of the dashboard.

The pilot must then first perceive the received information, then understand it by using his memory, and lastly react by using his experience.

The understanding of the situation is based on the recognition of the signature of the breakdowns or failures that he may have recorded during his training or experience. "Signature of a failure" refers to all of the observable effects of an operational capacity failure or avionics equipment breakdown.

This signature recognition mechanism is effective when the failures are simple and their effects are easily recognizable and unambiguous. The effects of a failure are ambiguous when several failures have the same effects.

However, once several breakdowns and/or failures are present at the same time, whether independently of one another or caused by one another, then the signatures of these breakdowns and/or failures become superimposed, such that it is very difficult for a pilot always to adopt an appropriate reaction.

SUMMARY OF THE INVENTION

The present invention aims to propose an electronic apparatus and a method for assisting the pilot of an aircraft, allowing the pilot to handle abnormal situations more effectively caused by malfunctions occurring in one or more avionics equipment.

To that end, the invention relates to an electronic apparatus for assisting a pilot of an aircraft, the aircraft including avionics equipment implementing operational capacities of the aircraft and a monitoring system, each avionics equipment being associated with one or several operating parameters, the monitoring system being configured to determine monitoring information relative to the aircraft from operating parameters and operational capacities, the apparatus being intended to be onboard the aircraft and comprising:
- an acquisition module configured to acquire the monitoring information from the monitoring system,
- an anomaly detection module configured to detect at least one anomaly from among a breakdown of an avionics equipment and a failure of an operational capacity, from acquired monitoring information and anomaly detection rules, the anomaly detection rules being contained in a predefined database, and
- an inference module configured to identify, for each detected anomaly, one or several causes that may have caused said anomaly, based on first level relationships between avionics equipment breakdowns and operational capacity failures, the first level relationships being contained in the predefined database.

According to other advantageous aspects of the invention, the electronic assistance apparatus comprises one or more of the following features, considered alone or according to all technically possible combinations:
- the apparatus further comprises a likelihood module configured to calculate, for each identified cause, a likelihood indicator based on at least one parameter chosen from the group consisting of: a likelihood of occurrence for each avionics equipment breakdown, a history of preceding avionics equipment breakdowns and a confidence level associated with the monitoring system, the parameters being contained in the predefined database;
- the apparatus further comprises an operational impact module configured to determine one or several operational capacities modified by the detected anomaly or anomalies, based on second level dependency relationships between operational capacity failures, the second level relationships being contained in the predefined database;
- the apparatus further comprises a first display module configured to display, on the screen intended for the pilot, each detected anomaly separately;
- the first display module is further configured to display the detected anomalies in the form of groups, with one group for each cause;
- the apparatus further comprises a second display module configured to display, on the screen intended for the pilot, each operational capacity;
- the second display module is further configured to display separately, on the one hand, the unchanged operational capacities, and on the other hand, the operational capacities modified by the detected anomaly or anomalies;
- the apparatus further comprises the predefined database.

The invention also relates to a method for assisting a pilot of an aircraft, the aircraft including avionics equipment implementing operational capacities of the aircraft and a monitoring system, each avionics equipment being associated with one or several operating parameters, the monitoring system being configured to determine monitoring information relative to the aircraft from operating parameters and operational capacities, the method being implemented by an electronic assistance apparatus and comprising:
  acquiring the monitoring information from the monitoring system,
  detecting at least one anomaly from among a breakdown of an avionics equipment and a failure of an operational capacity, from acquired monitoring information and anomaly detection rules, the anomaly detection rules being contained in a predefined database, and
  identifying, for each detected anomaly, one or several causes that may have caused said anomaly, based on first level relationships between avionics equipment breakdowns and operational capacity failures, the first level relationships being contained in the predefined database.

According to other advantageous aspects of the invention, the assistance method comprises one or more of the following features, considered alone or according to all technically possible combinations:
  the method further comprises calculating, for each identified cause, a likelihood indicator based on at least one parameter chosen from the group consisting of: a likelihood of occurrence for each avionics equipment breakdown, a history of preceding avionics equipment breakdowns and a confidence level associated with the monitoring system, the parameters being contained in the predefined database; and
  the method further comprises determining one or several operational capacities modified by the detected anomaly or anomalies, based on second level dependency relationships between operational capacity failures, the second level relationships being contained in the predefined database.

The invention also relates to a computer program including software instructions which, when implemented by a computer apparatus, carry out a method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION OF PREFERRED EMBODIMENTS

Figure 1:
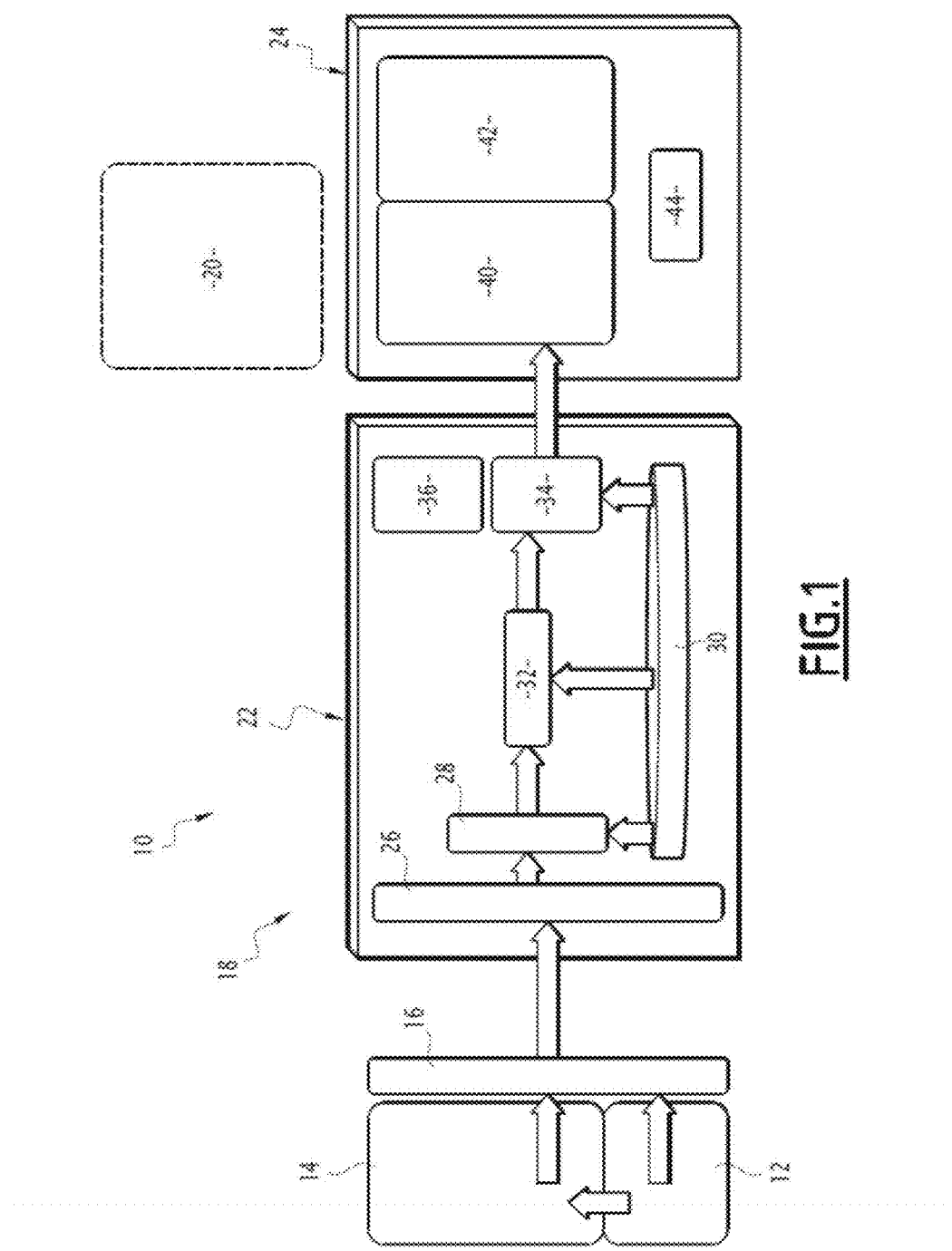
FIG. 1 is a diagrammatic illustration of an aircraft comprising avionics equipment implementing operational capacities of the aircraft, a monitoring system configured to determine monitoring information relative to the aircraft from operating parameters and operational capacities, and an electronic apparatus according to the invention for assisting an aircraft pilot.

In FIG. 1, an aircraft 10 comprises avionics equipment 12 implementing operational capacities 14 of the aircraft, a monitoring system 16, an electronic apparatus 18 for assisting an aircraft pilot, and a display screen 20.

In the example of FIG. 1, the aircraft 10 is for example an airplane able to be piloted by at least one pilot. Alternatively, the aircraft 10 is a helicopter, or a drone piloted remotely by a pilot.

In a known manner, the operation of the aircraft 10 comprises a maintenance phase piloted by the or each maintenance operator, and flight phases piloted by the or each pilot.

The present invention only relates to one or several flight phases of the aircraft 10. Each flight phase is in particular chosen from among the group consisting of: a takeoff phase, an ascent phase, a cruising phase, a decent phase and a landing phase.

Figure 3:
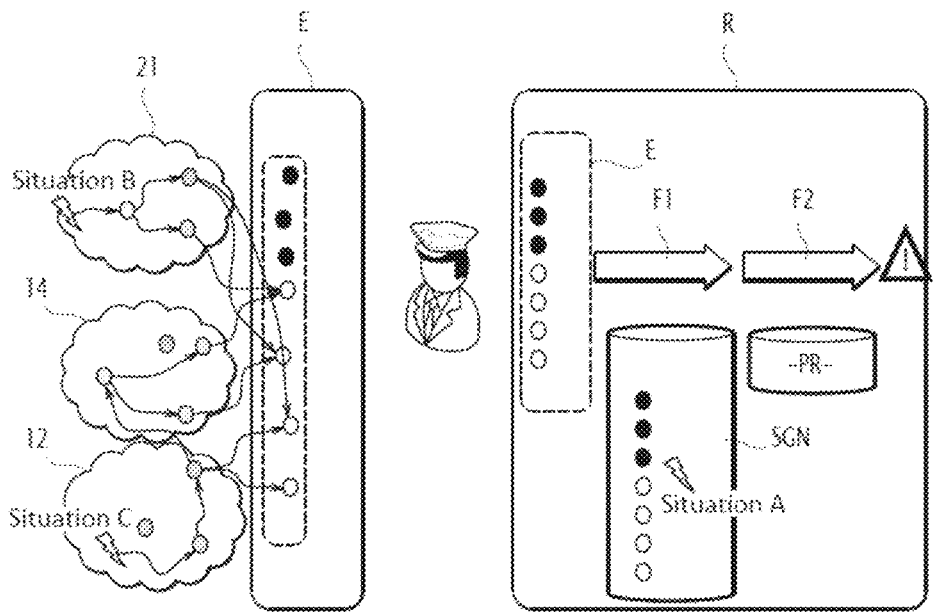
FIG. 3 is a diagrammatic illustration of handling of a failure within an aircraft of the state of the art.
Figure 4:
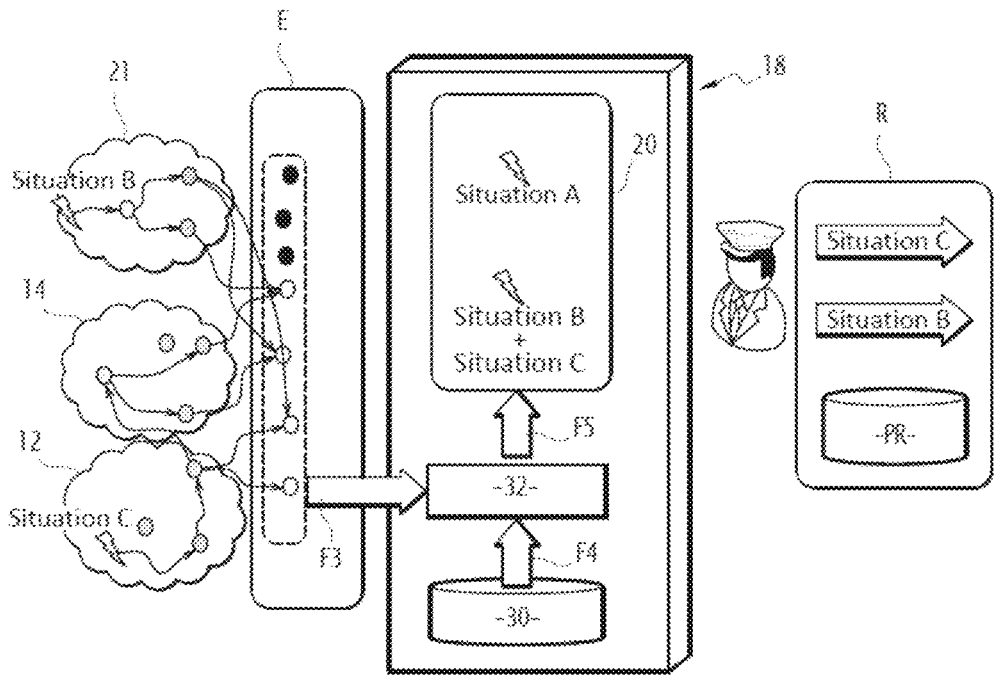
FIG. 4 is a diagrammatic illustration of handling of a failure within an aircraft according to the invention.

The aircraft 10 is able to move under the influence of outside conditions forming an environment 21, visible in FIGS. 3 and 4. These outside conditions for example comprise weather conditions or air traffic in the area around the aircraft 10, i.e., at a distance from the aircraft 10 smaller than a predefined distance.

Each avionics equipment 12 is associated with one or several operating parameters. "Avionics equipment" refers to a device that is at least partially electronic or a combination of such devices, onboard the aircraft 10 and able to carry out one or several services making it possible to operate the aircraft 10.

As an example, such avionics equipment 12 are, for example, a flight management system (FMS), a satellite positioning system, such as a global positioning system (GPS), an inertial reference system (IRS), an instrument landing system (ILS), a microwave landing system (MLS), a runway overrun prevention system (ROPS), a radio altimeter (RA), and/or a traffic alert and collision avoidance system (TCAS).

Such avionics equipment 12 generally have different combinations of mechanical and electronic devices. Additionally or alternatively, such avionics equipment 12 are also a landing gear or any type of leading edge slats and flaps having combinations of different mechanical devices.

Each avionics equipment 12 is associated with a plurality of operating parameters characterizing a current configuration. Each operating parameter is for example able to assume a numerical value to characterize the current configuration of the corresponding avionics equipment 12.

The operating parameters then have different numerical values for different configurations of the corresponding avionics equipment 12. For example, an operating parameter associated with a flap corresponds to different configurations of that flap, such as the open flap or retracted flap. This operating parameter is for example able to assume a numerical value corresponding to the opening angle of that flap to characterize its current configuration.

Services implemented by at least some of the avionics equipment 12 relative to a specific piloting purpose form an operational capacity 14 of the aircraft 10. "Operational capacity" thus refers to a plurality of services provided by the aircraft 10, avionics equipment 12 to accomplish a predetermined piloting aim. Each operational capacity 14 is therefore implemented by one or several avionics equipment 12.

Additionally, at least one operational capacity 14 is implemented by one or several functional chains, each functional chain comprising a combination of several avionics equipment 12 implementing corresponding services in a predetermined order.

When one or several services forming an operational capacity 14 are no longer available, for example following a malfunction of the piece(s) of avionics equipment 12 corresponding to those services, the operational capacity 14 is said to have failed, the unavailability of at least one service of the operational capacity 14 corresponding to a failure of said operational capacity 14.

In other words, a failure is detected for an operational capacity 14 when one or several services forming said operational capacity 14 are no longer available.

Each operational capacity 14 is for example chosen from the group consisting of:
propulsion of the aircraft 10, also known as "Power Sources";
control of the speed of the aircraft 10, also known as "Speed Management";
control of the altitude of the aircraft 10, also known as "Alt Management";
control of the flight parameters of the aircraft 10, also known as "Flight Control";
monitoring of Icing Conditions;
control of approach categories of the aircraft 10, such as CAT2 or CAT3 DUAL known in themselves;
Required Navigation Performance (RNP);
Localizer Performance with Vertical Guidance (LPV);
Vertical Navigation (VNAV);
Instrument Landing (IL);
radar altimetric mode, also called RAD ALT Mode;
Reduced Vertical Separation Minima (RVSM);
minimum navigation performance specifications (MNPS);
communication with the ground or other aircraft via text messages (Datalink);
Satellite Communication (SatCom);
communication via high-frequency (HF) waves;
communication via very high-frequency (VHF) waves;
monitoring of the relief;
monitoring of air traffic;
monitoring of weather conditions;
monitoring and actuation of different control surfaces of the aircraft 10;
passenger information; and
control of the taxiing of the aircraft 10.

The monitoring system 16 is configured to determine monitoring information relative to the aircraft from operating parameters and operational capacities 14.

The monitoring system 16 is able to monitor the operation of the other avionics equipment 12. In particular, during the operation of the aircraft 10, the surveillance system 16 is able to assign each other avionics equipment 12 a normal or faulty operating state to characterize the availability of that avionics equipment 12 to carry out corresponding services.

To that end, the surveillance system 14 is connected to the avionics equipment 12, and is able to receive and analyze the operating parameters of those avionics equipment 12 to determine their operating state.

The operating state of an avionics equipment 12 is the normal state when the avionics equipment 12 is able to carry out all of the mandatory services for which it is designed. The mandatory services are predefined for each avionics equipment 12.

The operating state of an avionics equipment 12 is the faulty state when the avionics equipment 12 is not able to carry out at least some of the mandatory services for which it is designed. The faulty state of the avionics equipment 12 corresponds to a breakdown of said avionics equipment 12.

In other words, a breakdown is detected for an avionics equipment 12 when the faulty state when the avionics equipment 12 is not able to carry out at least some of the mandatory services for which it is intended.

The monitoring system 16 is for example a crew alerting system (CAS) or a Flight Warning System (FWS), known in themselves.

The electronic assistance apparatus 18 is intended to be onboard the aircraft 10. The electronic assistance apparatus 18 is connected to the monitoring system 16 to receive the operating states of the avionics equipment 12 determined by the monitoring system 16, and the display monitor 20 to communicate information to the pilot.

The electronic assistance apparatus 18 comprises an electronic device 22 for calculating an operational situation of the aircraft 10 and an electronic interface device 24 with the pilot.

The situation calculating device 22 includes an acquisition module 26 configured to acquire the monitoring information from the monitoring system 16, and an anomaly detection module 28 configured to detect at least one anomaly from among a breakdown of an avionics equipment 12 and a failure of an operational capacity 14, from acquired monitoring information and anomaly detection rules. The anomaly detection rules are contained in a predefined database 30. They are preferably predefined, and they make it possible to define the anomaly conditions.

The situation calculating device 22 further includes, according to the invention, an inference module 32 configured to identify, for each detected anomaly, one or several causes that may have caused said anomaly, based on first level relationships between avionics equipment 12 breakdowns and operational capacity 14 failures. The first level relationships are contained in the predefined database 30, and are preferably predefined.

As an optional addition, the situation calculating device 22 further includes a likelihood module 34 configured to calculate, for each identified cause, a likelihood indicator based on at least one parameter chosen from the group consisting of: a likelihood of occurrence for each avionics equipment breakdown, a history of preceding avionics equipment breakdowns and a confidence level associated with the monitoring system, the parameters being contained in the predefined database 30.

As an optional addition, the situation calculating device 22 further includes an operational impact module 36 configured to determine one or several operational capacities 14 modified by the detected anomaly or anomalies, based on second level dependency relationships, also called second relationships, between operational capacity failures, the second level relationships being contained in the predefined database 30.

As an optional addition, the situation calculating device 22 preferably includes said predefined database 30. Alternatively, the database 30 is a database outside the electronic assistance apparatus 18 and connected thereto.

The situation calculating device 22 is for example a computer including a processor and a memory, not shown, the memory being associated with the processor. The acquisition module 26, the anomaly detection module 28, the inference module 32, the likelihood module 34 and the operational impact module 36 are then, for example and if applicable, made in the form of an acquisition software program, an anomaly detection software program, an inference software program, a likelihood software program, and an operational impact software program, respectively, these programs being able to be stored in the memory and executed by the processor. Alternatively, the acquisition module 26, the anomaly detection module 28, the inference module 32, the likelihood module 34 and the operational impact module 36 are made in the form of one or several programmable logic components, such as FPGA (Field-Programmable Gate Array), or in the form of one or several dedicated integrated circuits, such as ASIC (Application-Specific Integrated Circuit).

The interface device 24 is connected to the situation calculating device 22, for example to the likelihood module 34. The interface device 24 includes a first display module 40 configured to display each detected anomaly separately on a screen intended for the pilot, for example on the display screen 20, or on a display screen integrated into the electronic assistance apparatus 18. The first display module 40 is further configured to display the detected anomalies in the form of groups, with one group for each cause.

As an optional addition, the interface device 24 further includes a second display module 42 configured to display each operational capacity on the screen intended for the pilot, for example on the display screen 20, or on a display screen integrated into the electronic assistance apparatus 18. The second display module 42 is further configured to display separately, on the one hand, the unchanged operational capacities, and on the other hand, the operational capacities modified by the detected anomaly or anomalies.

As an optional addition, the interface device 24 further includes an interaction module 44 to allow the pilot, or the crew, to interact with the electronic assistance apparatus 18, for example to request the display of certain information.

The interface device 24 is then configured to allow the display of the available operational capacities and the lost operational capacities; all of the situations that may explain the observed anomalies; and a likelihood level of each of the situations. As an optional addition, the interface device 24 allows the pilot to request, via the interaction module 44, additional explanations for example to justify the displayed likelihood level.

The interface device 24 is for example a computer including a processor and a memory, not shown, the memory being associated with the processor. The computer forming the interface device 24 is for example a computer separate from that forming the situation calculating device 22. Alternatively, the operational situation calculating device 22 and the interface device 24 are made in the form of a single computer including the processor and the memory. The first display module 40, the second display module 42 and the interaction module 44 are then, for example and if applicable, made in the form of a first display software program, a second display software program, and an interaction software program, respectively, these programs being able to be stored in the memory and executed by the processor of the corresponding computer. Alternatively, the first display module 40, the second display module 42 and the interaction module 44 are made in the form of one or several programmable logic components, such as FPGA, or in the form of one or several dedicated integrated circuits, such as ASIC.

The anomaly detection rules are predefined, and they make it possible to define the anomaly conditions. As a purely illustrative example, the anomaly detection rules include the verification of whether the deviation between the speeds provided by two sensors is greater than 10 knots, or whether the number of failure messages of the avionics equipment 12 is sufficient to confirm the appearance of a failure, or in the example of failure of the control surface, verification of whether the measured turning angle is greater than the commanded turning angle.

The first level relationships are also called cause-effect relationships between breakdowns of avionics equipment 12 and operational capacity failures 14. They are preferably defined in the form of logic proposals.

As an example, for a status message of a flight control computer, a first relationship defining that a message M1 signaling an incorrect state of the flight control computer can be caused by a failure P1 of a power circuit or a failure P2 of said flight control computer, will be defined in the form of the following logic formulation: M1=P2 or P1.

The second level relationships are also called dependency relationships between operational capacity failures 14. They are preferably defined in the form of logic proposals.

By generalizing this type of formulation, the database 30 will for example contain a set of logic proposals with the form corresponding to first level or two relationships:

M1=P2 or P1;
M2=P3;
M3=P4 or P5;
M4=P5 or P4 or P3 or P2 or P1;

with "or" designating the OR logic operator.

According to the preceding, the database 30 contains the detection rules and the first level relationships, i.e., the relationships between the breakdowns of the resources, or avionics equipment 12, and the failures of operational capacities 14 that they cause.

As an optional addition, the database 30 also contains the second level relationships, i.e., the dependencies between failures of operational capacities 14; dependency relationships with the states of the aircraft 10 (flight phases, optional equipment, etc.); and likelihood rules.

The inference module 32, also called inference engine, is then configured to use all of the monitoring messages received from the monitoring system 16 by the acquisition module 26 and processed by the anomaly detection module 28, based on the first level relationships contained in the database 30.

The inference module 32 is therefore configured to process all of the first level relationships that correspond to the monitoring messages, received from the monitoring system 16 by the acquisition module 26, and processed by the anomaly detection module 28, in order to identify one or several causes that may have caused each anomaly detected by the anomaly detection module 28.

In other words, the inference module 32 is suitable for finding all of the causes that may explain observed effects corresponding to the received monitoring messages. The inference module 32 is thus configured to process logic proposals based on messages indicating that a failure has or has not been observed.

The inference module 32 only takes into consideration the causal explanations, i.e., according to the first level and two relationships, also called cause-effect relationships, contained in the database 30.

In the following of the description, the non-limiting and purely illustrative example of a situation, where the aircraft 10 tends to turn, will be described in order to illustrate one implementation of the electronic assistance apparatus 18. During a first control surface failure, the aircraft 10 tends to turn, but this scenario also occurs upon a breakdown of one of the engines of the aircraft 10. If, under the effect of stress or a lack of experience, the pilot does not verify the engine status, he may believe that an engine failure is occurring, whereas it is a control surface breakdown. As it will be explained below, the electronic assistance apparatus 18 will then assist the pilot in making the right diagnosis, in order to take the appropriate corrective action.

In the case of a control surface breakdown, the inference module 32 will for example receive the following messages:

M1=false, here meaning that a control computer is healthy;

M2=true, here meaning that the pressure of a hydraulic control circuit of the control surface is insufficient;

M3=false, here meaning that the power of an engine is correct; and

M4=true, here meaning that the right drift is abnormal.

It should be noted that in the case of inattention by the pilot, it is for example assumed that the latter does not notice that the engine power is correct, i.e., that M3=false.

Furthermore, the database 30 contains the following first level relationships:

M1=P1 or P2, where P1 is a breakdown of the flight control computer and P2 is a breakdown of the energy supply circuit;

M2=P3, where P3 is a breakdown of the hydraulic circuit;

M3=D1, where D1 is a failure corresponding to a loss of power of the engine; and M4=D3, where D3 is a failure corresponding to a right drift.

The database 30 also contains the following second level relationships:

D1=P4 or P5, where P4 is a breakdown corresponding to a leak of a kerosene circuit and P5 is a breakdown of an engine regulating computer;

D2=P1 or P2 or P3, where D2 is a failure corresponding to a control surface deviation; and D3=D1 or D2.

In case of control surface breakdown, from the received message as indicated above, the inference module 32 will process the following set of logic proposals:

P1 or P2=false;
P3=true;
P4 or P5=false; and
P5 or P4 or P3 or P2 or P1=true.

In the case of a control surface breakdown, the inference module 32 then deduces:

P1=false and P2=false, here meaning an absence of breakdown P1 or P2;

P3=true, here meaning that the breakdown P3 is detected;

P4=false and P5=false, here meaning an absence of breakdown P4 or P5.

Here, the inference module 32 consequently determines that the message M4 is reduced to P3.

One skilled in the art will note that without taking the message M3=false into account, the message M4 is ambiguous and the causes explaining the drift are then P3 or P4 or P5, i.e., hydraulic circuit breakdown or engine breakdown, which then explains a possible error in judgment by the pilot.

The likelihood module 34 is configured to calculate the likelihood indicator for each identified cause. In other words, the likelihood module 34 is suitable for determining a degree of likelihood of a causal result given by the inference module 32.

In order to calculate the likelihood indicator for each identified cause, the likelihood module 34 is then suitable for using at least one parameter chosen from the group consisting of: a likelihood of occurrence for each avionics equipment breakdown (i.e., failure rate), a history of preceding avionics equipment breakdowns and a confidence level associated with the monitoring system, such as an abnormally high false detection rate, these parameters being contained in the database 30.

As an optional addition, the likelihood module 34 is suitable for using any other information of a nature to refine the likelihood of the possible causes explaining the observed situations.

The calculation of the likelihood indicator associated with a message depends on the false alarm rates presented by that message relative to the failure it is supposed to signal.

If A is the monitored failure and M is the message indicating that failure, there are then four different scenarios, as shown in table 1 below, depending on whether the message indicates the failure (i.e., positive message) or not (i.e., negative message), and depending on whether the failure is confirmed (i.e., present) or not (i.e., absent).

TABLE 1

|  | Positive message | Negative message |
| --- | --- | --- |
| Failure present | True-positive | False-negative |
| Failure absent | False-positive | True-negative |

The likelihood module 34 is then configured to calculate a likelihood indicator for each received message, the calculation varying depending on whether the message indicates the presence or absence of a failure. Indeed, the error of a failure detector, such as a sensor, is not necessarily symmetrical: the detector can be credible when it indicates the presence of a failure and not credible when it indicates its absence.

The likelihood module 34 is then configured to calculate a likelihood indicator of a positive message, also called credibility of a positive message, using the following equation:

$$CP(M) = P(M \mid A) \log \frac{P(M \mid A)}{P(M \mid \overline{A})} \quad (1)$$

where the corresponding conditional probabilities respectively verify the following equations:

$$P(M \mid A) = \frac{P(M \cap A)}{P(A)} \quad (2)$$

$$P(M \mid \overline{A}) = \frac{P(M \cap \overline{A})}{P(\overline{A})} \quad (3)$$

The likelihood module 34 is then configured to calculate a likelihood indicator of a negative message, also called credibility of a negative message, using the following equation:

$$CN(M) = P(\overline{M} \mid \overline{A}) \log \frac{P(\overline{M} \mid \overline{A})}{P(\overline{M} \mid A)} \quad (4)$$

where the corresponding conditional probabilities respectively verify the following equations:

$$P(\overline{M} \mid \overline{A}) = \frac{P(\overline{M} \cap \overline{A})}{P(\overline{A})} \quad (5)$$

$$P(\overline{M} \mid A) = \frac{P(\overline{M} \cap A)}{P(A)} \quad (6)$$

True-positive, False-positive, False-negative and True-negative rates, respectively, are the conditional probabilities $P(M|A)$, $P(M|\overline{A})$, $P(\overline{M}|A)$ and $P(\overline{M}|\hat{A})$, respectively. These conditional probabilities are values associated with each message and each observed failure.

These conditional probabilities $P(M|A)$, $P(M|\overline{A})$, $P(\overline{M}|A)$ and $P(\overline{M}|\overline{A})$, respectively, are preferably predefined and stored in the database 30. They are calculated and adjusted relative to the experience acquired relative to the quality of the detectors.

As an optional addition, the likelihood module 34 is next configured to compare the indicator calculated for the received message with a predefined threshold in order to evaluate the likelihood of the failure or the absence of failure, indicated in the received message.

The operational impact module 36 is next configured to determine the operational capacity or capacities 14 modified by the detected anomaly or anomalies, based on second level relationships, i.e., dependency relationships between operational capacity failures. In other words, the operational impact module 36 is suitable for determining the operational capacities 14 affected by the failures using dependency relationships contained in the database 30.

Figure 2:
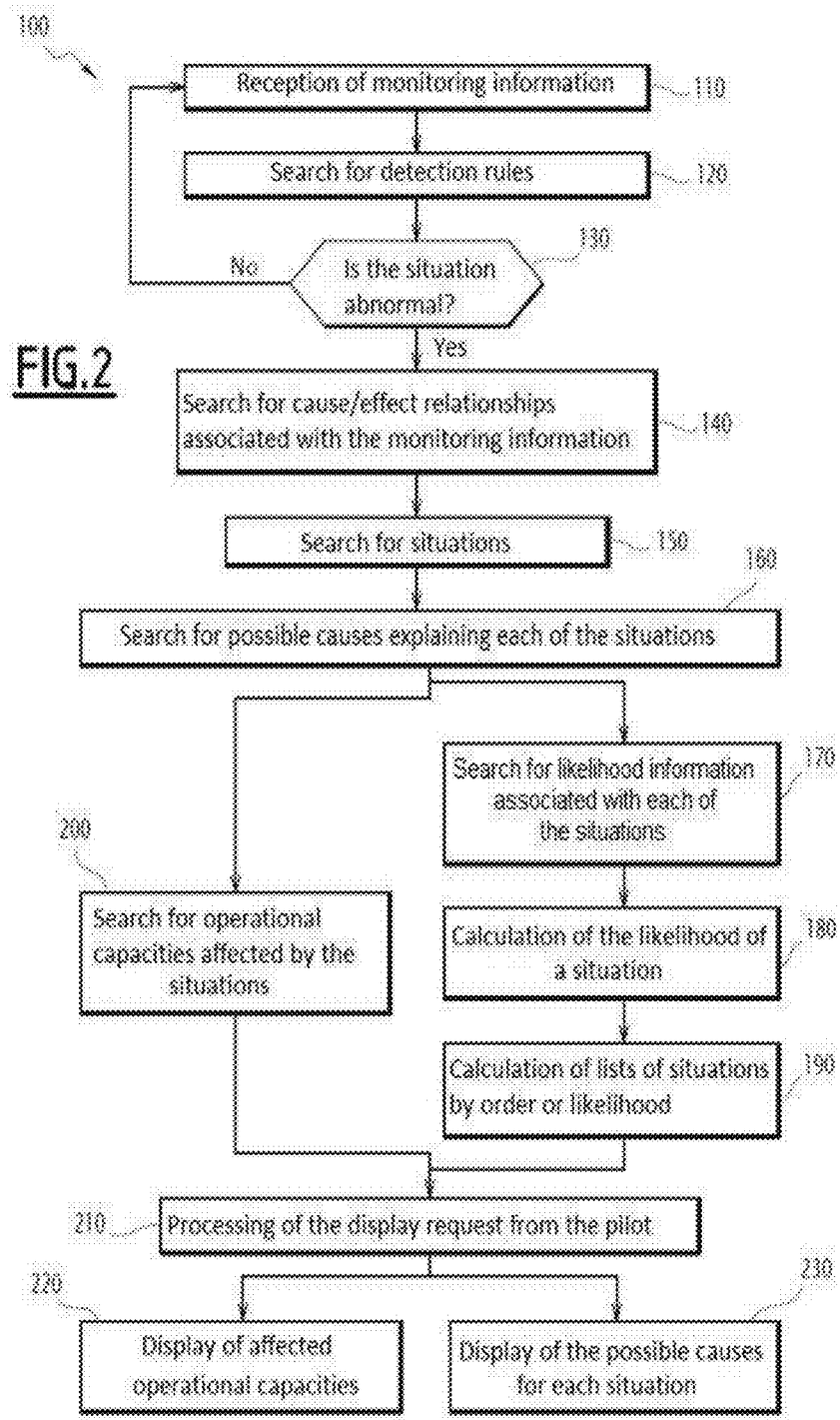
FIG. 2 is a flowchart of a method according to the invention for assisting an aircraft pilot.

The operation of the electronic assistance device 18 will now be explained in light of FIG. 2, showing a flowchart of the assistance method 100 according to the invention.

During an initial step 110, the acquisition module 26 acquires the monitoring information from the monitoring system 16. It then collects the monitoring information. This information corresponds to an observed set of effects resulting from breakdowns or failures.

During the following step 120, the anomaly detection module 28 applies the detection rules from the database 30 to the monitoring information acquired by the acquisition module 26, which allows it to determine, during the following step 130, whether the situation, i.e., the set of monitoring information, is normal. During step 130, the anomaly detection module 28 thus detects, if applicable, at least one anomaly from among a breakdown of an avionics equipment 12 and a failure of an operational capacity 14, from acquired monitoring information and anomaly detection rules contained in a predefined database 30.

If the situation is deemed normal, the method returns to the initial acquisition step 110; otherwise, the method goes to the following step 140.

When an abnormal situation is detected, the inference module 32 first looks, during step 140, for the corresponding first level relationships in the database 30. In other words, the inference module 32 looks in the database 30 for cause-effect relationships associated with the detected breakdown(s) or failure(s).

The inference module 32 implements inference algorithms during the following step 150, to separate causes associated with the detected breakdown(s) or failure(s) into ambiguity groups. This separation of the causes into ambiguity groups is described in document FR 2,973,882 A1.

For each situation thus distinguished, the inference module 32 looks, during step 160, for all of the causes that may be at the source of the current abnormal situation. During step 160, the inference module 32 thus identifies, for each detected anomaly, one or several causes that may have caused said anomaly, based on first level relationships contained in the predefined database 30. As an optional addition, once the situations are identified and the possible causes explaining these situations are determined by the inference module 32, the likelihood module 34 extracts, during the following step 170, from the database 30, the information associated with each possible cause, such as the likelihood of occurrence, and each monitoring information, such as the True-positive, False-positive, False-negative and True-negative rates, i.e., the probabilities $P(M|A)$, $P(M|\overline{A})$, $P(\overline{M}|A)$ and $P(\overline{M}|\overline{A})$, respectively.

The likelihood module 34 next calculates, during step 180 and using the aforementioned information from the database 30, a likelihood indicator $CP(M)$, $CN(M)$ for each identified cause.

During step 190, the likelihood module 34 sequences, by order of likelihood, the situations that the operational situation calculating device 22 has previously determined.

The operational impact module 36 determines, in step 200, in parallel with steps 170 to 190, the impact of each of the situations on the operational capacities 14. The operational impact module 36 thus determines the operational capacity or capacities 14 affected by the detected anomaly or anomalies, based on second level relationships contained in the database 30.

When the pilot or crew issues a display request, that request is taken into account by the interaction module 44 during step 210. During step 220, the second display module 42 displays information relative to the operational capacities 14, for example displaying the available operational capacities 14 on the one hand, and the absent or lost operational capacities 14 on the other hand. The second display module 42 thus makes it possible to highlight the affected operational capacities for the anomaly or anomalies previously detected by the anomaly detection module 28.

Lastly, during step 230, the first display module 40 displays the possible causes for each detected abnormal situation, as well as the associated explanations. Depending on the degree of detail desired by the pilot, the first display module 40 displays the causes identified by the inference module 32, and optionally the corresponding likelihood indicators calculated by the likelihood module 34, as well as, optionally, also the first level relationships between avionics equipment 12 breakdowns and operational capacity 14 failures, so as to provide the pilot with explanations relative to the diagnosis given by the electronic assistance apparatus 18.

The electronic assistance apparatus 18 then allows the pilot to handle abnormal situations more effectively caused by malfunctions occurring in one or several avionics equipment 12, as explained below in light of FIGS. 3 and 4, where FIG. 3 shows the handling of an abnormal situation with a simple monitoring system of the state of the art, and FIG. 4 shows the handling of the same abnormal situation using the electronic assistance apparatus 18 according to the invention.

In FIG. 3, a set of visible effects E results from the superposition of two abnormal situations B and C, situation B for example pertaining to the environment 21 of the aircraft and situation C pertaining to one of the avionics equipment 12 of the aircraft. In this case, the reasoning process R of the pilot then for example comprises recognition of the superimposed signature of situations B and C as being equal to the signature of a situation A (arrow F1). In this case, the pilot then makes an inappropriate decision (arrow F2) by applying his knowledge of the procedures PR to the situation A, rather than to the combination of situations B and C. In other words, the pilot is unfortunately led into error by situation A, which is comparable to the superposition of situations B and C.

In FIG. 4, in the presence of a same set of visible effects E resulting from the superposition of two abnormal situations B and C, the electronic assistance apparatus 18 takes into account, via its inference module 32, on the one hand the set of visible effects E (arrow F3), from monitoring information acquired by the acquisition module 26, then anomalies detected by the anomaly detection module 28, and on the other hand, the first level relationships between avionics equipment breakdowns and operational capacity failures from the database 30 (arrow F4) to diagnose the situation and present it to the pilot on the display monitor 20 (arrow F5). In this case, the diagnosis done by the electronic assistance apparatus 18 indicates that the state of the airplane may be situation A, but that there is also a possibility that situations B and C are present at the same time.

This contribution of information to the pilot then prevents the latter from processing only the erroneous case of situation A, the pilot also retaining his discretionary power, applying the procedures for eliminating doubt according to his knowledge of the procedures PR, and thus having a reasoning process R adapted to the exact situation of the aircraft 10.

The determination of a likelihood indicator for each identified cause makes it possible to still further assist the pilot, in particular when there are multiple identified causes, by then proposing a hierarchy of identified causes based on their likelihood.

The determination of the operational capacity or capacities 14 modified by the detected anomaly or anomalies also makes it possible to further assist the pilot by establishing a relationship between the detected anomalies and the affected operational capacities 14, in order to next inform the pilot about the affected operational capacities 14.

One can thus see that the electronic assistance apparatus 18 and the associated assistance method 100 allow the pilot to handle abnormal situations more effectively caused by malfunctions occurring in one or more avionics equipment 12, which creates a decrease in risks during flight phase(s) of the aircraft 10 and thereby improves the flight safety of the aircraft 10.

The invention claimed is:

1. An electronic apparatus for assisting a pilot of an aircraft, the aircraft including avionics equipment implementing operational capacities of the aircraft and a monitoring system, each avionics equipment being associated with one or several operating parameters, the monitoring system being configured to determine monitoring information relative to the aircraft from operating parameters and operational capacities, the apparatus being intended to be onboard the aircraft and comprising:
an acquisition circuit configured to acquire the monitoring information from the monitoring system,
an anomaly detection circuit configured to detect at least one anomaly from among a breakdown of an avionics equipment and a failure of an operational capacity, from acquired monitoring information and anomaly detection rules, the anomaly detection rules being contained in a predefined database,
an inference circuit configured to identify, for each detected anomaly, one or several causes that may have caused said anomaly, based on first level relationships between avionics equipment breakdowns and operational capacity failures, the first level relationships being contained in the predefined database, and
a likelihood circuit configured to calculate, for each identified cause, a likelihood indicator based on at least one parameter chosen from the group consisting of: a likelihood of occurrence for each avionics equipment breakdown, a history of preceding avionics equipment breakdowns and a confidence level associated with the monitoring system, the parameters being contained in the predefined database.

2. The apparatus according to claim 1, wherein the apparatus further comprises a first display module configured to display, on a screen intended for the pilot, each detected anomaly separately.

3. The apparatus according to claim 2, wherein the first display module is further configured to display the detected anomalies in the form of group(s), with one group for each cause.

4. The apparatus according to claim 1, wherein the apparatus further comprises a second display module configured to display, on a screen intended for the pilot, each operational capacity.

5. The apparatus according to claim 4, wherein the apparatus further comprises an operational impact circuit configured to determine one or several operational capacities modified by the detected anomaly or anomalies, based on second level dependency relationships between operational capacity failures, the second level relationships being contained in the predefined database, and
wherein the second display module is further configured to display separately the unchanged operational capacities and the operational capacities modified by the detected anomaly or anomalies.

6. The apparatus according to claim 1, wherein the apparatus further comprises the predefined database.

7. An electronic apparatus for assisting a pilot of an aircraft, the aircraft including avionics equipment implementing operational capacities of the aircraft and a monitoring system, each avionics equipment being associated with one or several operating parameters, the monitoring system being configured to determine monitoring information relative to the aircraft from operating parameters and operational capacities, the apparatus being intended to be onboard the aircraft and comprising:
an acquisition circuit configured to acquire the monitoring information from the monitoring system,
an anomaly detection circuit configured to detect at least one anomaly from among a breakdown of an avionics equipment and a failure of an operational capacity, from acquired monitoring information and anomaly detection rules, the anomaly detection rules being contained in a predefined database,
an inference circuit configured to identify, for each detected anomaly, one or several causes that may have caused said anomaly, based on first level relationships between avionics equipment breakdowns and operational capacity failures, the first level relationships being contained in the predefined database, and
an operational impact circuit configured to determine one or several operational capacities modified by the detected anomaly or anomalies, based on second level dependency relationships between operational capacity failures, the second level relationships being contained in the predefined database.

8. The apparatus according to claim 7, wherein the apparatus further comprises a first display module configured to display, on a screen intended for the pilot, each detected anomaly separately.

9. A method for assisting a pilot of an aircraft, the aircraft including avionics equipment implementing operational capacities of the aircraft and a monitoring system, each avionics equipment being associated with one or several operating parameters, the monitoring system being configured to determine monitoring information relative to the aircraft from operating parameters and operational capacities, the method being implemented by an electronic assistance apparatus and comprising:

acquiring the monitoring information from the monitoring system, detecting at least one anomaly from among a breakdown of an avionics equipment and a failure of an operational capacity, from acquired monitoring information and anomaly detection rules, the anomaly detection rules being contained in a predefined database, identifying, for each detected anomaly, one or several causes that may have caused said anomaly, based on first level relationships between avionics equipment breakdowns and operational capacity failures, the first level relationships being contained in the predefined database, and calculating, for each identified cause, a likelihood indicator based on at least one parameter chosen from the group consisting of: a likelihood of occurrence for each avionics equipment breakdown, a history of preceding avionics equipment breakdowns and a confidence level associated with the monitoring system, the parameters being contained in the predefined database.

10. The method according to claim 9, wherein the method further comprises determining one or several operational capacities modified by the detected anomaly or anomalies, based on second level dependency relationships between operational capacity failures, the second level relationships being contained in the predefined database.

11. A non-transitory computer readable medium on which is stored a computer program including software instructions which, when implemented by a computer apparatus on an aircraft including avionics equipment implementing operational capacities of the aircraft and a monitoring system, each avionics equipment being associated with one or several operating parameters, the monitoring system being configured to determine monitoring information relative to the aircraft from operating parameters and operational capacities, is configured to implement the steps of:

acquiring the monitoring information from the monitoring system, detecting at least one anomaly from among a breakdown of an avionics equipment and a failure of an operational capacity, from acquired monitoring information and anomaly detection rules, the anomaly detection rules being contained in a predefined database, identifying, for each detected anomaly, one or several causes that may have caused said anomaly, based on first level relationships between avionics equipment breakdowns and operational capacity failures, the first level relationships being contained in the predefined database, and calculating, for each identified cause, a likelihood indicator based on at least one parameter chosen from the group consisting of: a likelihood of occurrence for each avionics equipment breakdown, a history of preceding avionics equipment breakdowns and a confidence level associated with the monitoring system, the parameters being contained in the predefined database.

* * * * *